(12) United States Patent
Lyon

(10) Patent No.: US 10,081,452 B2
(45) Date of Patent: Sep. 25, 2018

(54) YOGURT BIN

(71) Applicant: Stephen Crowell Lyon, Minnetonka, MN (US)

(72) Inventor: Stephen Crowell Lyon, Minnetonka, MN (US)

(*) Notice: Subject to any disclaimer, the term of this patent is extended or adjusted under 35 U.S.C. 154(b) by 0 days.

(21) Appl. No.: 15/447,236

(22) Filed: Mar. 2, 2017

(65) Prior Publication Data
US 2017/0275045 A1   Sep. 28, 2017

Related U.S. Application Data

(60) Provisional application No. 62/304,096, filed on Mar. 4, 2016.

(51) Int. Cl.
| | | |
|---|---|---|
| B65D 1/34 | (2006.01) | |
| B65D 5/38 | (2006.01) | |
| B65D 81/02 | (2006.01) | |

(52) U.S. Cl.
CPC ............... B65D 5/38 (2013.01); *B65D 1/34* (2013.01); *B65D 81/02* (2013.01); *B65D 2571/00444* (2013.01)

(58) Field of Classification Search
CPC .... A47F 1/04; A47F 1/06; A47F 1/065; A47F 1/08; A47F 1/082; A47F 1/085; A47F 1/087; A47F 1/10; A47F 1/106; A47F 1/12; A47F 1/123; A47F 1/125; A47F 1/126; A47F 1/128
USPC ............... 211/59.2, 59.3; 206/527; 221/194; 312/45; D6/515, 516, 517
See application file for complete search history.

(56) References Cited

U.S. PATENT DOCUMENTS

| | | | | | |
|---|---|---|---|---|---|
| 2,852,327 | A | * | 9/1958 | Mason | A47F 1/087 |
| | | | | | 211/59.2 |
| 2,915,162 | A | * | 12/1959 | Umstead | A47F 1/087 |
| | | | | | 193/27 |
| 2,996,344 | A | * | 8/1961 | Garman | A47F 1/087 |
| | | | | | 229/122 |
| 3,784,022 | A | * | 1/1974 | Beesley, Jr. | A47B 87/005 |
| | | | | | 193/27 |
| 4,006,824 | A | * | 2/1977 | Snediker | A47F 1/04 |
| | | | | | 211/59.2 |
| 4,228,903 | A | * | 10/1980 | Eckert | A47F 1/12 |
| | | | | | 193/2 D |
| 4,598,828 | A | * | 7/1986 | Young | A47F 1/12 |
| | | | | | 211/59.2 |

(Continued)

FOREIGN PATENT DOCUMENTS

FR   2107090 A5 *  5/1972  ............. A47F 1/126

*Primary Examiner* — Joshua E Rodden
(74) *Attorney, Agent, or Firm* — Invention To Patent Services; Alex Hobson

(57) ABSTRACT

A yogurt bin for holding a plurality of individual dairy cartons of yogurt includes a floor, two sidewalls, a first end wall and a second end wall. The two sidewalls are attached to the floor. At least one of the sidewalls has at least one finger slot therein. The finger slot is dimensioned to allow access to individual dairy cartons positioned near the finger slot but not to allow an individual dairy carton to pass through the finger slot. The first end wall is attached to the floor of the bin. The first end wall has a stop near the floor of the bin and a handle attached to the sidewalls positioned near the top of the bin. The second end wall is also attached to the two sidewalls.

19 Claims, 9 Drawing Sheets

(56) References Cited

U.S. PATENT DOCUMENTS

| | | | | |
|---|---|---|---|---|
| 4,744,489 A * | 5/1988 | Binder | ................... | A47F 1/087 211/128.1 |
| 5,228,590 A * | 7/1993 | Blasko | ................... | B65D 83/02 206/504 |
| 5,351,838 A * | 10/1994 | Flum | ................... | A47F 5/005 211/153 |
| 5,396,997 A * | 3/1995 | Johnson | ................... | A47F 1/087 211/59.2 |
| D380,113 S * | 6/1997 | Byrd | ................... | D6/515 |
| 6,364,157 B1 * | 4/2002 | Tosspon | ................... | A47F 1/08 221/191 |
| D474,042 S * | 5/2003 | Chang | ................... | D6/515 |
| 6,637,604 B1 * | 10/2003 | Jay | ................... | A47F 1/12 211/59.2 |
| 7,207,447 B2 * | 4/2007 | Medcalf | ................... | A47F 1/087 211/59.2 |
| D563,127 S * | 3/2008 | Henry | ................... | A47F 1/087 D6/515 |
| D584,548 S * | 1/2009 | Parker | ................... | D6/515 |
| 7,631,771 B2 * | 12/2009 | Nagel | ................... | A47F 3/0486 211/59.3 |
| 7,918,365 B2 * | 4/2011 | White | ................... | A47F 1/087 221/123 |
| 7,997,427 B2 * | 8/2011 | Lowenbraun | ................... | A47F 1/12 211/59.2 |
| 8,047,400 B1 * | 11/2011 | Luberto | ................... | G07F 11/34 221/194 |
| 2006/0196840 A1 * | 9/2006 | Jay | ................... | A47F 1/12 211/59.2 |
| 2009/0212066 A1 * | 8/2009 | Bauer | ................... | A47F 1/087 221/281 |
| 2011/0147323 A1 * | 6/2011 | Sainato | ................... | A47F 1/12 211/59.2 |
| 2016/0095449 A1 * | 4/2016 | James | ................... | A47F 1/04 211/59.2 |
| 2016/0150894 A1 * | 6/2016 | Howard | ................... | A47F 1/126 211/59.3 |

* cited by examiner

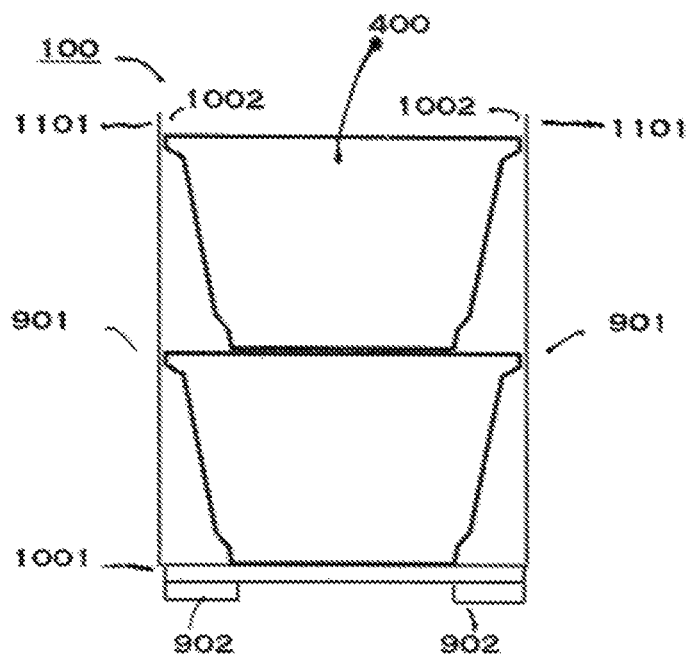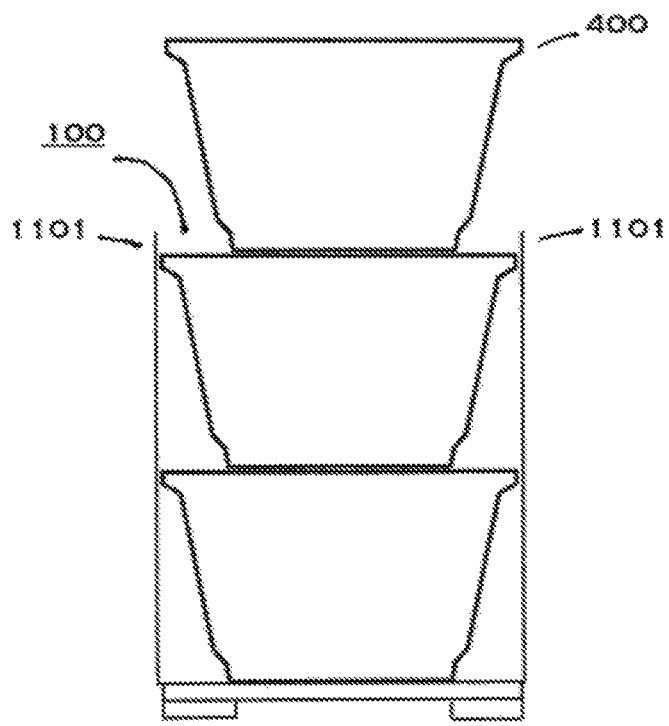

YOGURT BIN

CROSS-REFERENCE TO RELATED APPLICATION

This application claims the benefit of provisional patent application No. 62/304,096, filed 2016 Mar. 4 by the present inventor.

FIELD OF THE INVENTION

The present invention is related to a yogurt bin, more specifically, the present Invention relates to a yogurt bin that neatly and compactly holds a multiple of individual yogurt cartons that can come in a variety of shapes by accommodating both a horizontal and lateral storage orientation.

BACKGROUND OF THE INVENTION

Yogurt, to include the Greek Yogurt variety is both a substantial and fast growing food category. Industry sources estimate U.S. sales this year will exceed Nine billion dollars. Greek Yogurt grew 5000 plus percent from 2004 till 2014 and now makes up over half of all yogurt sales. As today's consumers seek healthier food choices, yogurt sales are expected to continue to grow.

It is estimated that 11 billion individually sized units of Yogurt will be sold in the United States in 2017. For perspective that compares to other significant and trending food and beverage categories like wine and single serve coffee. Where it is estimated that annually 4 billion standard size (750 ml) wine bottles are sold and 10 billion of the popular single serving coffee variety commonly known as the Keurig K-cup are sold each year. Merchants and manufacturers that sell products in both these categories are often promoting to their customers to buy more than one at a time. For example, wine is often sold in cases of 12. To accommodate the storage challenge that these multiple purchases create at the household level the housewares industry has developed a variety of specifically sized, holders, bins, and racks, that help the end user conveniently organize the individual containers in a way that makes them available for frequent and often daily use. These bins are largely designed with universal properties, to hold a variety of jars, baggies, cups, etc. Until now there has not been a bin that is designed specifically for yogurt.

A storage solution is ripe for the Yogurt consumer. Many Yogurt customers consume one or more individual cartons each day and many households have more than one member that do this. Yogurt has clearly become a daily staple. Fourteen individual cartons or more is a week's supply for just two people in a household who eat Yogurt daily. Yogurt requires refrigeration, and such space is at a premium and can become overwhelmed by the potential of dozens of Yogurt containers randomly stacked in randomly open areas within. Such a situation makes it harder to find the desired Yogurt variety, let alone much of what else is stored in the refrigerator. Also when yogurt is randomly stacked the potential for knocking over other items in this process is increased. And such a level of disorganization and randomness can make the already tight refrigerator space seem even more so. Refrigerated items like Yogurt are perishable and not being able to easily find products can increase the chance that when they are found they can be expired.

SUMMARY OF THE INVENTION

The invention disclosed within. is a yogurt specific storage solution that addresses the problems described above. A problem that is exacerbated by the fact that Yogurt is offered by many different makers, in many different varieties, package shapes and sizes. Given that, the solution described herein is unique as it is nearly universal.

This invention focuses on holding sizes intended for individual single portion consumption. The sizes that make up that market are typically around a half pint or under. A huge portion of that market is made up of similar packaging. For example the containers offered by competing companies are often similar and uniform in shape. When you consider sales figures, a huge portion of the individual market comes down to offerings in basically 4 reasonably uniform package shapes. The invention described herein holds all of them. All four package shapes can fit within the bin in an upright position. One of the four packages, is a unique frustoconical cone or reverse cone shape that is exclusive to the Yoplait Original Yogurt brand. This particular shape when stored horizontally roll easily. The bin will also accommodate this shape in the horizontal position and has features that allow the carton to roll naturally to the front of the bin, where it can be easily removed, in a manner where it will not fall out. Storing this carton horizontally, allows more cartons to be stored within the designated space than if the cartons were in an upright position.

The two largest categories of yogurt are Greek and Swiss. Greek has achieved significant growth in recent decades and in the United States now represents over half of all yogurt sales. Greek yogurt is predominantly sold in a tulip shape package that is marketed for individual consumption. The tulip shape has become an iconic shape associated with Greek yogurt regardless of who makes it. While the frusto conical or reverse cone shape has become iconic to Swiss style yogurt, that package shape can generally only be found in the Yoplait brand. Other non-Greek varieties can be found offered by other name and generic brands of yogurt in the other two major varieties of individual carton packaging. As this invention is described, examples that accommodate both the tulip and reverse cone packaging are emphasized as they make up the vast majority of units sold.

Greek yogurt continues to grow with United States sales concentrated in four leading brands to include, Dannon, Yoplait, Chobani, and Fage. You will also find store brands. While the variety of flavors and formula offerings seems endless and ever changing, surprisingly similar packaging is shared, between the four brands as well as store brands. That being tulip shape with a general height of approximately 2.25 inches and a round opening on top with a diameter that measures approximately 3.75 inches. To be clear, the leading brands come from different manufacturers and each brand has its own version of the tulip shape carton. However, when you compare the dimensions for the four brands they are not exact but are very close. This commonalty is believed to be related to the packaging equipment that has been developed by the equipment makers to fill yogurt on an assembly line at the food processing plant. The machines themselves have specifications for the size range of package it can fill, which drives a form of standardization between leading brands.

This discovery allows for the invention to be nearly universal in spite of a great variety of product offerings. When combined with the ability to hold the Yoplait Original brand reverse cone package in the lateral position described above, it is believed that the invention will hold a variety of the single serve cartons that combined would achieve a 95% share of this market segment.

Grocers predominantly feature yogurt in their weekly advertising, it is considered both a daily staple, as well as an item that draws the customer into the store. An ad that features a Greek Yogurt individual carton for example could have a fairly typical price of 99 cents. Also typical are ads that feature multiple pricing. Warehouse clubs such as Sam's and Costco sell yogurt in cardboard boxes that contain a dozen or more individual cartons and such activity can drive the consumer to load up large stocks of yogurt. All of these are reasons that support the need for this invention that has features to hold large multiples of individual cartons in a compact easy to reach fashion.

Yogurt manufactures offer predominantly individual cartons for sale. Such a strategy helps accommodate the choice of the typically dozens of flavors of yogurt that are available within one brand. Additionally, Yogurt makers will also pack the better selling flavors in a sleeve or wrap that often combines four to eight cartons in one package. While such a sleeve will initially hold the individual cartons of yogurt together it does need to be opened to access the Yogurt within and at this time the end user will discard the sleeve or wrap material and will no longer function to hold the Yogurt together. The invention described here within can also enhance this marketing strategy by offering the invention as its own package. In cases like this, the invention could be pre-packed with the multiples of individual cartons allowing the end user to purchase the bin along with the stock of yogurt contained within. If needed, conventional elements, such as a cardboard, glue dots, or cellophane overwrap can be added to the combination of holder and yogurt within to additionally secure the yogurt. In one case the bin could be durable enough in nature that it could be reused as a daily tool for storing and organizing Yogurt in the future, well after the initial purchase. In another case the Yogurt maker may opt to make the bin out of more disposable materials intended for a single use.

The invention can also be adopted for use with "Smart Fridge" technology. The bin could also include a weighing device, and an electronic device capable of communicating through a Wi-Fi, or similar system to other electronic devices. A system such as this could ultimately let the end-user know how much yogurt they have on hand, additionally that information could be used to reorder that yogurt automatically based on pre sets determined by the operator from suppliers such as Wallmart.com, Amazon, etc.

Arguably, the Refrigerator is some of the most valuable space in one's home. Refrigeration comes at a price, both for the initial unit and the cost to operate it. The actual interior space of a refrigerator is very small, typically 10 to 20 cubic feet. Most refrigerators come with shelf's that can be adjusted in height to accommodate a vast variety of package sizes and shapes as well as loose random food items. However even with said adjustability the end result is often under optimized and disorganized space. The invention here within addresses this through its design, which consider common shelf heights and the dimensions of the fairly standard size individual yogurt carton sizes. An example of this is starting with the size of an upright 12 oz. soda pop or beer can, which measures 4.83 inches. Cans of this height can be found in almost any Refrigerator and are so prevalent, that it is likely that one of the shelf's in that refrigerator has been set to allow just enough clearance for the height of the can. Typically a 5" clearance is enough to accommodate. The invention is designed to fit on that same shelf in a way that it will nest a stack of two fairly standard Greek Yogurt cartons, which based on the tallest known package offering of this type would be 4.5". While more on this can be found latter in the disclosure, the height of portions of the invention can rise just enough above 4.5" to provide some nesting ability for a stack of three fairly standard Greek Yogurt cartons. However too much of an additional rise will mean the holder itself no longer fits on the same shelf as the soda pop can. However, when the holder does contain the stack of three, the stack itself would be approximately 6.75" tall, so when the holder includes the stack of 3 it would have to placed on a shelf that has more than a 5" clearance. This provides additional flexibility that works to optimize the refrigerator space, which is accomplished by moving the holder to the appropriate shelf based on how many containers are being held. Keep in mind that the amount of yogurt containers an end-user will have on hand will vary, typically based on when they last went to the grocery store to stock up. The holder can be moved from shelf to shelf and in the process take on more capacity in a three high stack configuration or the other extreme, take up less overall room, to include the yogurt within, when moved to a lower clearance shelf. Such foresight in design considerations are useful and result in an overall invention that is compact, easy to assess and can perform more than one function within the same space helping to overcome the space challenges within the refrigerator. Having a slight rise above a typical stack provides the flexibility described and could be applied to any combination of stacks, starting with as little as one high. In this case the holder would hold one high and could fit on a shelf with even less clearance than 5 inches, but when moved from that shelf to the higher clearance shelf a two high stack could be accommodated holding twice the individual yogurt cartons.

Storage bins exist for other items, some are for specific items such as eggs, others are more universal such as a tray with some wall structure. Most of them are made out of molded plastics. This invention most likely will be made out of plastic but could also be made out of something else, such as, cardboard and metal. The architecture that makes up the invention is described and illustrated in the description, drawings and claims to follow. It generally starts with four walls perpendicular to ground with a solid floor that runs parallel to the ground and an open top. Unique utility features that address the problems described above with yogurt storage have been incorporated into the invention which as you will see make it much, much more than a generic open top box.

BRIEF DESCRIPTION OF THE DRAWINGS

The invention is pointed out in the claims. However, a more complete understanding of the present invention may be derived by referring to the detailed description and additional specification when considered in connection with the figures, wherein like reference numbers refer to similar items throughout the figures and:

FIG. 12 is a cross-sectional view of the yogurt bin taken along line 202—of FIG. 2 and FIG. 10, which is a line that divides in half the bin, it is shown with a three high stack of tulip shaped dairy cartons inside the bin according to an example embodiment of this invention.

FIG. 13 is a cross-sectional view of the yogurt bin taken along line 202—of FIG. 1, and FIG. 10, which is a line that divides in half the bin, it is shown with just one reverse cone dairy carton inside the bin according to an example embodiment of this invention.

DETAILED DESCRIPTION

The description and additional specification set out herein illustrates the various embodiments of the invention and such description is not intended to be construed as limiting in any manner.

Figure 1:
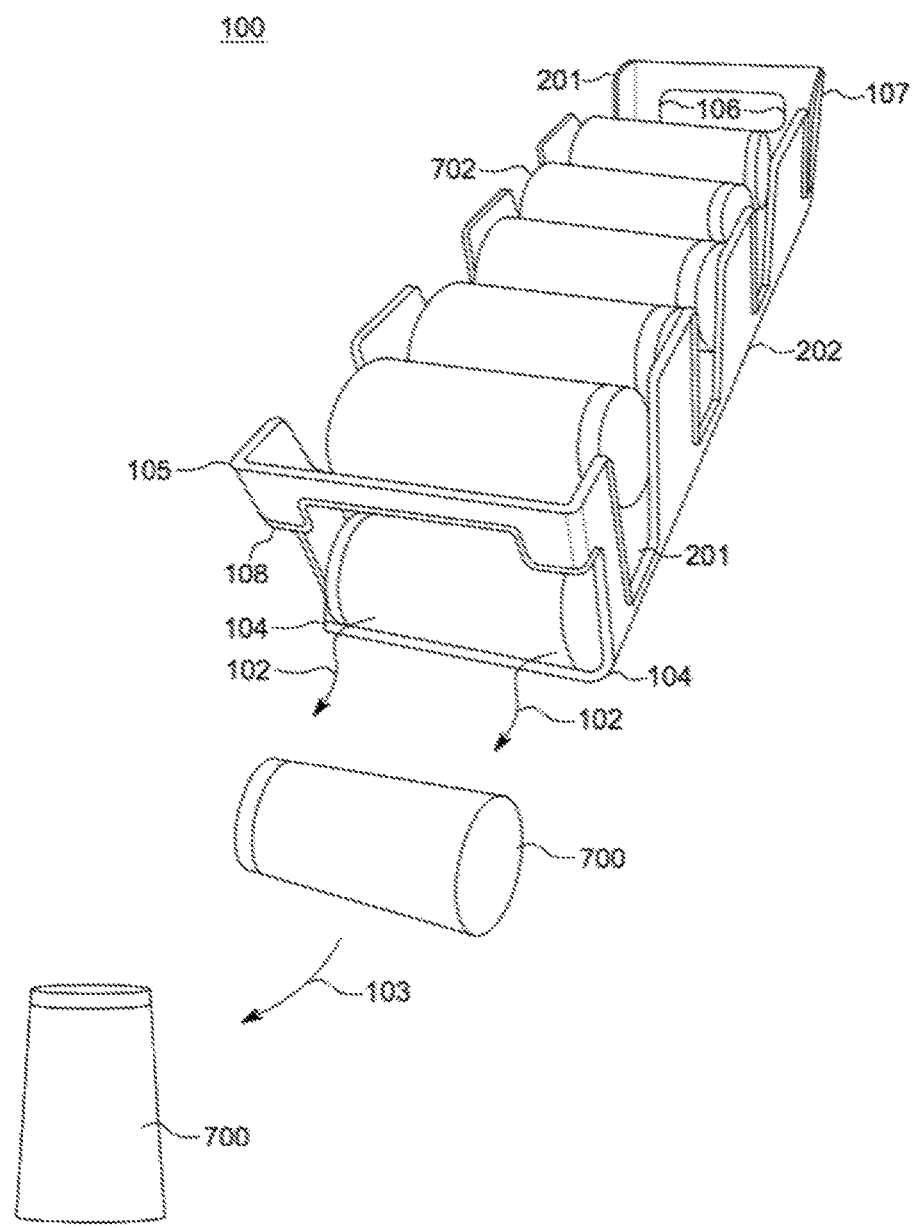
FIG. 1 is a perspective view of the Yogurt bin; it appears here filled with the reverse cone dairy carton placed within in a lateral position, according to an example embodiment.
Figure 2:
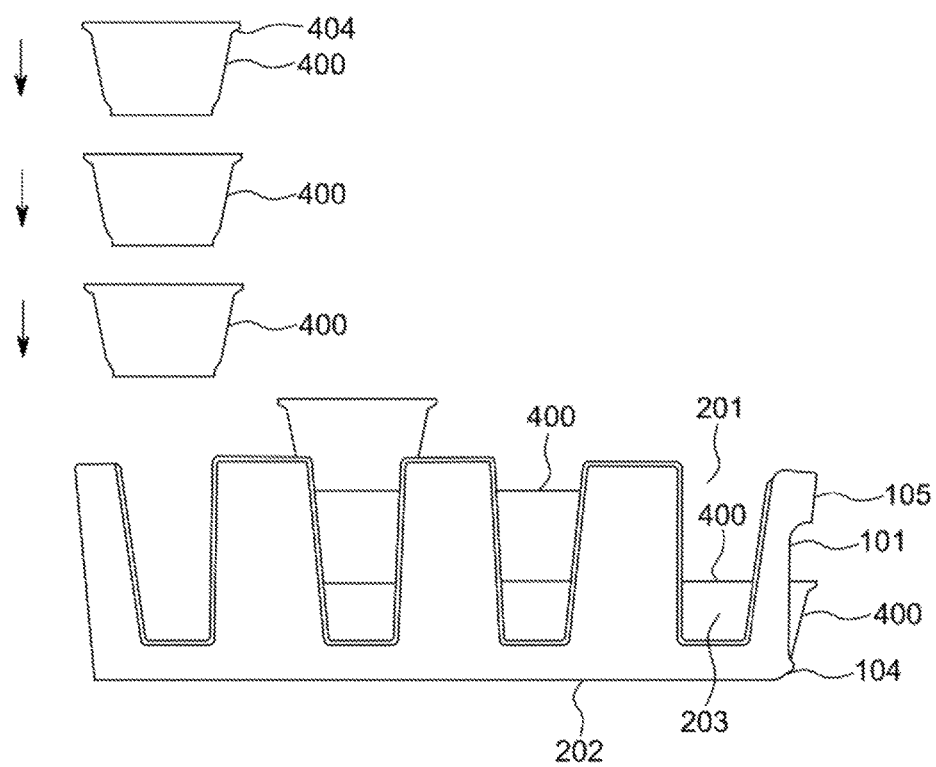
FIG. 2 is a side view of the Yogurt bin; It appears here filled with the tulip shaped dairy carton stacked in an upright position, according to an example embodiment.
Figure 3:
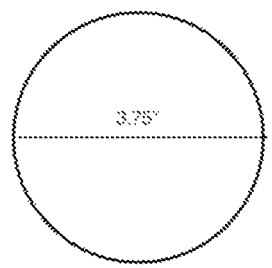
FIG. 3 is an overhead view of the top of the tulip shaped dairy carton with dimensions.
Figure 6:
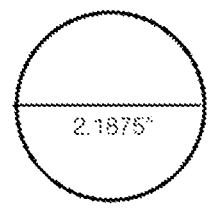
FIG. 6 is an overhead view of the top of the reverse cone or frustoconical cone dairy carton with dimensions.
Figure 4:
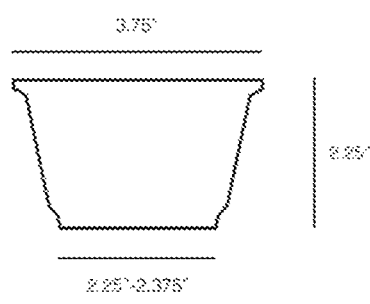
FIG. 4 is a side view of the tulip shaped dairy carton with dimensions.
Figure 7:
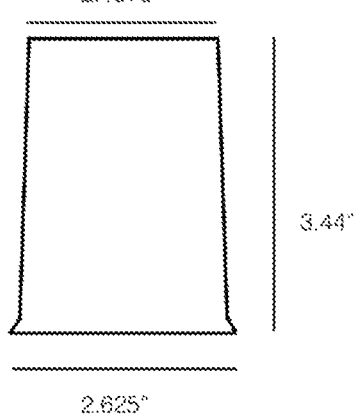
FIG. 7 is a side view of the reverse cone shaped or frustoconical cone shaped dairy carton with dimensions.
Figure 5:
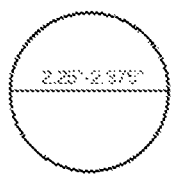
FIG. 5 is an underneath view of the bottom of a tulip shaped dairy carton with dimensions.
Figure 8:
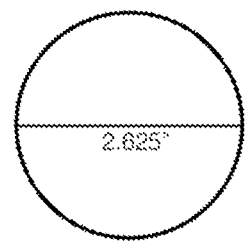
FIG. 8 is an underneath view of the bottom of the reverse cone shaped dairy carton with dimensions.

The drawings in FIG. 1 and FIG. 2 illustrate two configurations of the yogurt bin, according to an embodiment of this invention. In FIG. 1, a configuration that enables multiples of the reverse cone dairy carton to be held in a lateral position. In FIGS. 2, the configuration that holds the tulip shape dairy carton in an upright position is illustrated. Both configurations will be detailed further in the text and additional illustrations that follows.

FIG. 1 shows the reverse cone carton 700 outside the yogurt bin right after it has been rolled out of the front opening 101 of the yogurt bin 100. The reverse cone container or carton is substantially the shape of a frusto-conical cone. In some embodiments an added lip may be on one end of the container. The arrows 102 illustrate the motion to achieve removal from the bin 700. The additional arrows 103 show the continued motion to turn the yogurt upright once it is removed from the bin 100. Multiples of the reverse cone carton 700 are also shown within the bin 100 in a lateral position. The reverse cone carton 700 because of it's round shape is prone to rolling. Additional features disclosed here within, prevent the reverse cone 700 from rolling out unintentionally, One of those features 104 is a curved stop area, that under the slope conditions created by the bin 100 will stop the reverse cone carton from rolling out. Because of the curved shape, the stop area 104 functions well to also aid in the removal the reverse cone carton 700 by the hand. Another feature is the front opening 101, which allows a hand to enter, grab and pull the reverse cone carton 700 out. Another feature is the handle 105, which acts as both a stop that helps to prevent the top layer reverse cone cartons 700 from coming out when the hand is used to remove the most immediate forward reverse cone carton 701 within the yogurt bin 100. The opening 101 is right sized to allow the carton removal function to occur. The handle 105 also serves to help pull the bin 100 in and out of the refrigerator. The back handle 106 combined with the front handle 105 will help the user carry the entire bin. Because the bin 100 has side walls it channels the reverse cone carton 700 in the lateral position and more than one container can be placed in the bin. Additionally the stop 104 combined with the front handle 105 and the back wall 107 work to eliminate the rolling out of multiples of the reverse cone carton 700. This prevents a scenario where the reverse cone cartons 700 would roll all over the place, especially when one attempts to stack a second layer of the reverse cone cartons 700 as FIG. 1 illustrates. The reverse cone cartons labeled 702. They have been placed on top of a lower layer of cartons.

FIG. 2 shows how the bin also holds the predominate Greek yogurt individual tulip shaped carton 400 in an upright position within the bin 100. This shows this iteration of the bin capable of holding a stack of tulip shaped cartons 3 high by 4 wide or a total of 12. Iterations of this invention could contain any combination of multiples. This iteration shows 4 finger slots 201, however other iterations may have fewer or more finger slots. The finger slots 201 are placed to allow each carton within the holder to be added or removed within all reaches of the bin. The finger slot at point 203 has an entry point enough below to create an opening that allows the user reach and remove the bottom dairy carton 400 from the yogurt bin. These slots also allow the user the ability to use just a finger, to move and turn yogurt cartons stored within the bin. This is useful to help the user to move containers towards the front opening, as well as view parts of the label through moving or turning that may not be visible otherwise. The upright configuration suited for the tulip shaped cartons 400 does not anticipate using a rolling motion for addition and removable like what has been demonstrated for the reverse cone carton 700. However the handles 105 and 106 work to aid in removing the entire bin 100 regardless of the type of carton used, which is also true for the utility of the finger slots 201.

FIG. 3, FIG. 4, FIG. 5, FIG. 6, FIG. 7, and FIG. 8 provide information on the two predominate dairy package shapes intended to be used in the bin 100. While almost all other individual cartons, can be used in the bin 100 as well, it is these two packages that optimize both the size and features of the bin 100. Much is discussed concerning package shapes in the prior "Background of the Invention" section of this disclosure.

Figure 9:
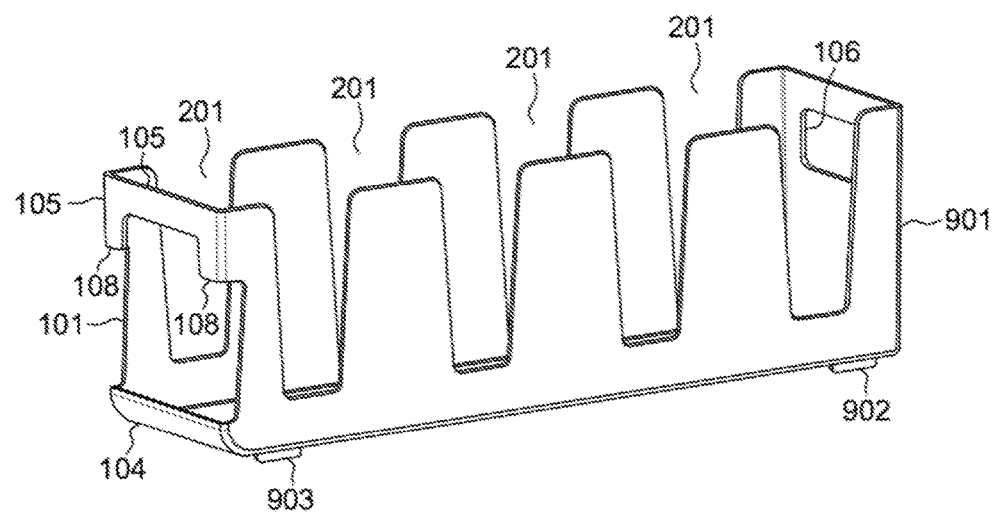
FIG. 9 is a perspective view of the yogurt bin according to an example embodiment of this invention.

FIG. 9 illustrates the bin 100, according to an embodiment of this invention, without the dairy cartons contained within. This shows four sets of the finger slots 201 on each of the side walls 901. The interferences provided by the four walls and floor provide a level of containment that works well for the predominate individual yogurt carton shapes. Integrated into the containment walls 901 are utility features, finger slots 201, opening 101, and handles 106, 105. The rear feet 902 are higher than the front feet 903, this is to provide a slope that allows the reverse cone carton 700 in the lateral position to roll towards the front. 108 illustrates the area of the handle that optimizes the ability for the hand to enter, while still allowing resistance to prevent additional reverse cone yogurt cartons from inadvertently falling out of the bin during the process of removal by the hand.

Figure 10:
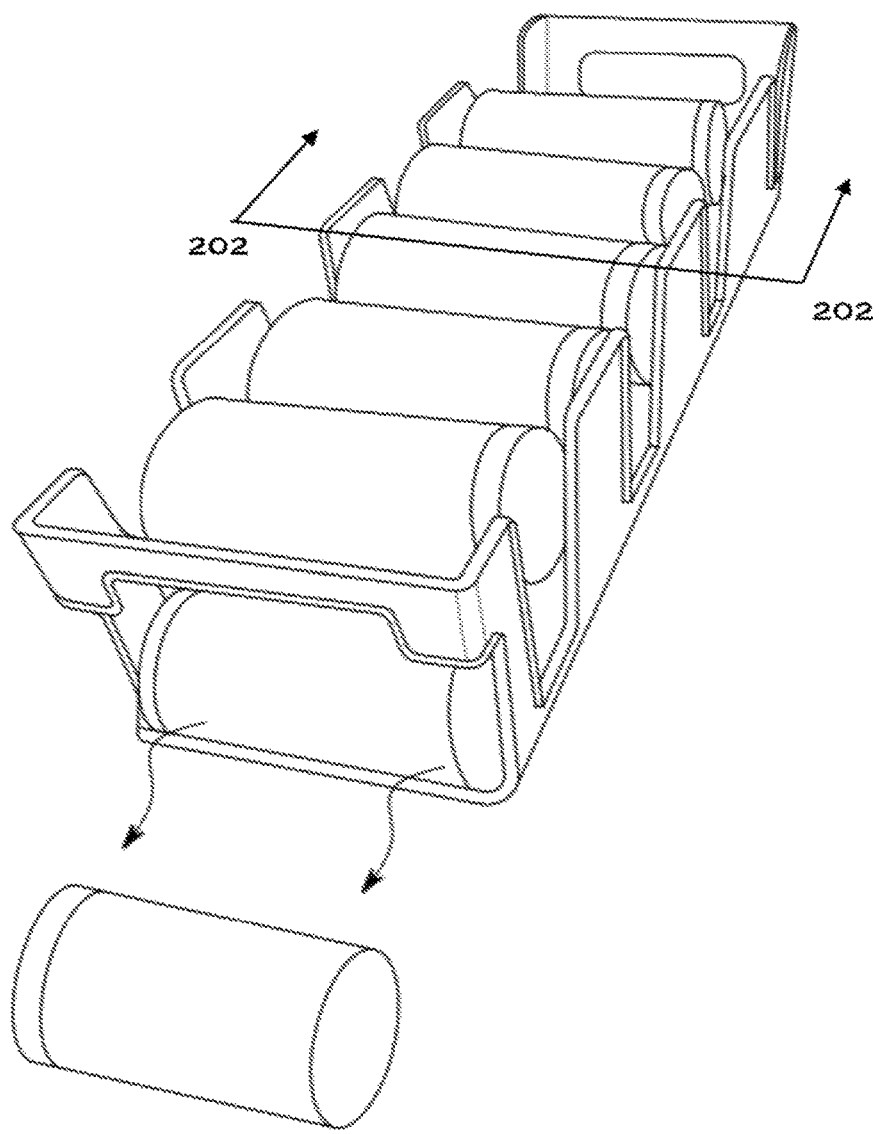
FIG. 10 is a perspective view of the yogurt bin according to an example embodiment of this invention and illustrates the cutaway line for FIGS. 11 and 12.

FIG. 10 shows the parting line 202 for the cutaway views to follow FIGS. 11-14.

Figure 11:
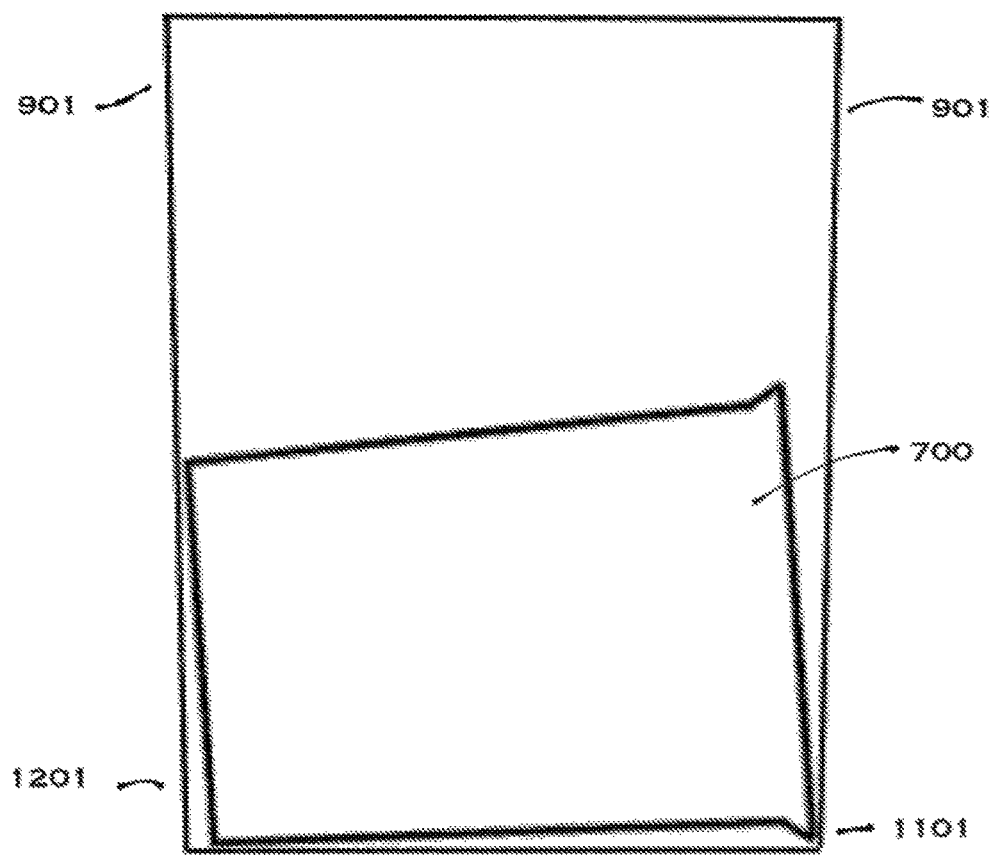
FIG. 11 is a cross-sectional view of the yogurt bin taken along line 202—of FIGS. 2 and 10 which is a line that divides in half the container, it is shown with a two high stack of tulip shaped dairy cartons inside the bin according to an embodiment of this invention.

FIG. 11 illustrates the reverse cone carton 700 when in the lateral position within the bin 100. Note the relationship to sidewalls 901 and floor 1001. The position is well suited for the rolling function to work that was detailed earlier under FIG. 1. In this illustration the distance between side walls 901 is the same as what is illustrated in FIG. 12 and FIG. 13 which also works to optimize the finger slot function. What is shown here is the same inner bin space also accommodating the dimensions of the tulip shaped carton 400 is a sidewall distance of between 3.625" and 3.81", the distance is greater at the top than it is at the bottom. See FIG. 7 for carton dimensions. This range of distance is significant as if it were much narrower it would constrict carton movement, if it were much wider, it would not provide the needed channeling effect to allowing rolling, and would cause a log jam effect particularly when more than one carton is being used as illustrated in FIG. 1. To avoid this it is also important to not have the finger slots 201 extend into the lower area 1201 of the side walls 901. If the finger slots extended this far, it is possible the reverse cone carton 700 could get caught up and log jam in the opening created by the finger slot 201.

FIG. 12 illustrates the tight fit between the side walls 901 and the tulip shaped carton 400. This relationship allows the finger slots 201 illustrated in FIG. 2 to function optimally.

The constraints of limited refrigerator space and the advantage of this inventions flexibility in that respect are discussed more in the "Summary of the Invention" section of the disclosure. Particularly, the advantage of having a bin 100 that will fit on the same shelf as an upright pop can. The invention walls 901, floor thickness 1001 and feet 902 create a height that will still allow the bin to fit on this shelf. Also note that the wall height within the bin 100 is still taller than the height of the two tulip shaped cartons 400 stacked on top of each other. The area from the top of the inside walls 1002 to the point where an extended plane that runs parallel from the top of the tulip shaped carton 400 would intersect that wall is labeled 1101.

FIG. 13 illustrates how an additional layer of the tulip shaped carton 400 can be supported by the bin 100 and this space 1101, provides a stop in the event the third carton is attempted to be pushed off the stack. A typical scenario for this to happen is when the consumer moves around within the tight refrigerator space trying to locate items. The invention in this iteration, when it holds a stack of two of the tulip shaped carton 400 is not too tall to fit on the shelf that holds the pop can. But when moved to a shelf that has the clearance to allow a stack of a three high stack of the tulip shaped carton 400, the sidewall area 1002 still provides protection for the inadvertent movement of the top row of the tulip shaped cartons 400. In other words, the wall height is taller than two tulip shaped cartons 400 so that when three tulip shaped cartons are stacked within the bin 100 a bottom portion of the third container is constrained from falling off the stack of three.

Figure 14:
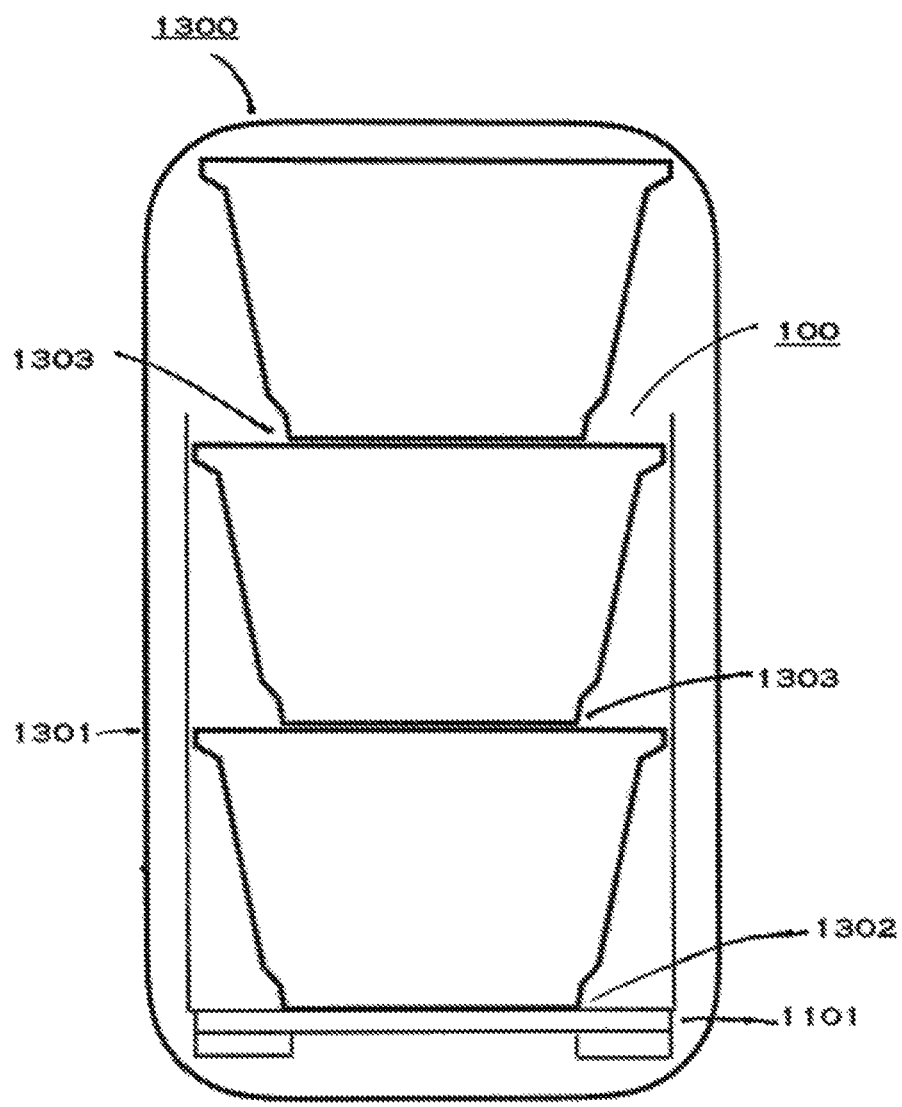
FIG. 14 is the same cross-sectional view of the yogurt bin in FIG. 13, but further illustrates the bin with a three high stack of tulip shaped dairy cartons packaged within an overwrap according to an example embodiment of this invention.

FIG. 14 illustrates how the bin 100 could be part of a package 1300 that contains a holder full with individual yogurt cartons within a means to hold it all together. Said means 1301 could be a wrap and or sleeve sufficiently applied to keep the desired combination intact. Also glue or glue dots could be applied at the points between parallel surfaces where the holder floor 1001 touches the bottom of the yogurt carton 1302 or the top of the yogurt carton touches the bottom of the yogurt carton above it 1303. The bin 100 could also be the package itself, in this case there would be no overwrap 1301, only some means such as glue or glue dots applied at points such as 1303 and 1302 described above and illustrated in FIG. 13.

Figure 15:
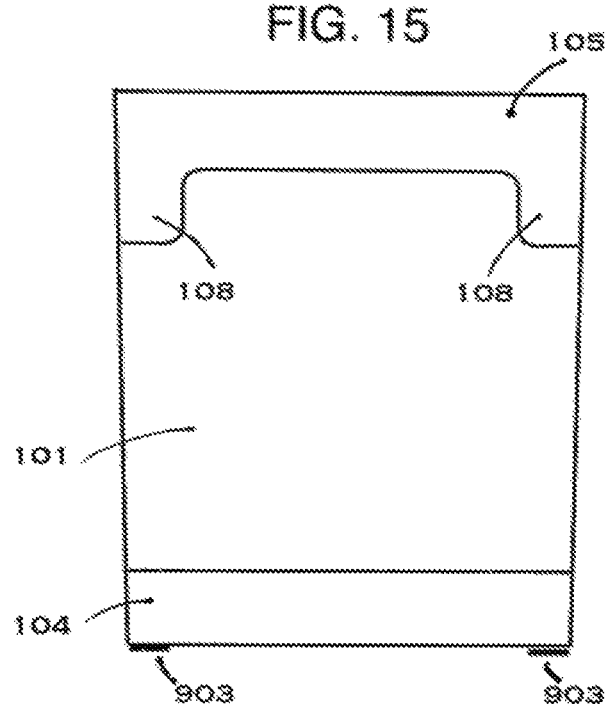
FIG. 15 is a view of the front end of the yogurt bin according to an example embodiment of this invention.
Figure 16:
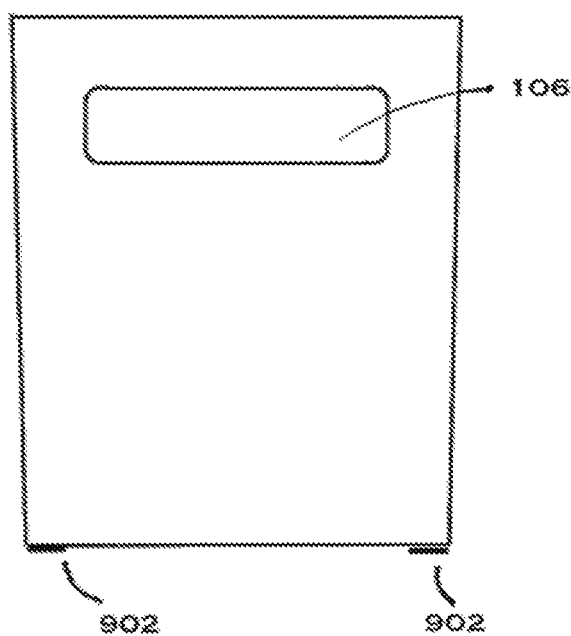
FIG. 16 is a view of the rear end of the yogurt bin according to an example embodiment of this invention

FIG. 15 and FIG. 16 Show front and rear views of the bin. The front and rear orientation is based on how the bin would typically be placed in a refrigerator by the end user. FIG. 15-101 is the opening that in some situations will allow the user to take the yogurt carton out of the bin through the front, also 105 acts as a handle so the user can pull the bin out, in some cases part way, which allows additional ability for the yogurt to be removed from the top. 104 is the stop area that has been discussed earlier. FIG. 16-106, shows the handle area on the rear side, which can be used along with the front handle FIG. 15-105 to carry the bin with two hands.

The yogurt bin is for holding a plurality of individual dairy cartons of yogurt includes a floor, two sidewalls, a first end wall and a second end wall. The two sidewalls are attached to the floor. At least one of the sidewalls has at least one finger slot therein. The finger slot is dimensioned to allow access to individual dairy cartons positioned near the finger slot but not to allow an individual dairy carton to pass through the finger slot. The first end wall is attached to the floor of the bin. The first end wall has a stop near the floor of the bin and a handle attached to the sidewalls positioned near the top of the bin. The second end wall is also attached to the two sidewalls.

In one embodiment, the yogurt bin for holding a plurality of individual dairy cartons of yogurt, the first end wall has an opening therein sized to allow one or more individual dairy cartons to pass there through. Careful consideration has been given to both the sizes of the predominate cartons, FIGS. 3-8, as well as the dimensions of the bin itself. Overall the invention is "right sized" to provide containment and ease of stocking and removal in both orientations. The size of the opening is based on this consideration, if it were too big, the cartons could inadvertently fall out, if too small, they would be hard to remove. Same logic also applies to the location and dimension ranges of the finger slots, and distance between walls.

In another embodiment, the yogurt bin for holding a plurality of individual dairy cartons of yogurt, the second end wall also includes a second handle.

In another embodiment, the yogurt bin for holding a plurality of individual dairy cartons of yogurt, has a sidewall that is taller than the height of the stack of dairy containers it is intended to hold completely within the bin, but no higher than that intended stack plus one more height of a container.

In another embodiment, the yogurt bin for holding a plurality of individual dairy cartons of yogurt, attaches a stop to the two sidewalls. In yet another embodiment said stop could be curved so that surface acts against the wall of a reverse cone dairy carton to keep that carton within the yogurt bin.

In another embodiment, the yogurt bin for holding a plurality of individual dairy cartons of yogurt has a distance between the two sidewalls about the same as the dimension of the largest diameter of an individual dairy carton yogurt container.

In another embodiment, the yogurt bin for holding a plurality of individual dairy cartons of yogurt has a distance between the two sidewalls about the same as the dimension of the height of an individual dairy carton yogurt container.

In another embodiment, the yogurt bin for holding a plurality of individual dairy cartons of yogurt has a distance between the two sidewalls that is more than the largest diameter of an individual dairy carton of yogurt and more than the height of an individual dairy carton of yogurt.

In another embodiment, the yogurt bin for holding a plurality of individual dairy cartons of yogurt can hold a first type of individual diary carton of yogurt and a second type of individual dairy carton of yogurt, the distance between the two sidewalls is more In another embodiment, the yogurt bin for holding a plurality of individual dairy cartons of yogurt holds a first type of individual diary carton of yogurt in an upright position.

In another embodiment, the yogurt bin for holding a plurality of individual dairy cartons of yogurt, holds the second type of individual diary carton in a lateral position.

In another embodiment, the yogurt bin for holding a plurality of individual dairy cartons of yogurt, wherein the second type of individual dairy carton of yogurt is frusto conical in shape, the yogurt bin allowing the second type of dairy carton of yogurt roll along the floor of the yogurt bin without log jamming with the sidewalls of the yogurt bin.

In another embodiment, the yogurt bin for holding a plurality of individual dairy cartons of yogurt holds a first type of individual diary cartons of yogurt in an upright position and a second type of individual dairy cartons of yogurt in a lateral position, the first type and the second type being held simultaneously.

In another embodiment, the yogurt bin for holding a plurality of individual dairy cartons of yogurt wherein the finger slots extend from a position above the floor of the bin to the top of the bin, the position above the floor of the bin being less than the height of an individual dairy carton of yogurt and less than the diameter of a dairy carton of yogurt.

In another embodiment, the yogurt bin for holding a plurality of individual dairy cartons of yogurt of wherein the floor of the yogurt bin is inclined, the lower portion of the floor being near the first end wall.

In another embodiment the yogurt bin for holding a plurality of individual dairy cartons of yogurt further has at least one leg near the second end wall that elevates the bin near the second end wall and tilts the floor of the yogurt bin of the floor toward the first end wall.

In another embodiment the yogurt bin for holding a plurality of individual dairy cartons of yogurt has a dimension between the side walls of the yogurt bin is in the range of 3.75 inches to 4.25 inches.

In another embodiment the yogurt bin for holding a plurality of individual dairy cartons of yogurt of claim 1 wherein the dimension between the side walls of the yogurt bin is in the range of 3.75 inches to 3.9 inches.

In another embodiment a bin for holding a plurality of individual food cartons comprising; a floor; two sidewalls attached to the floor, at least one of the sidewalls having at least one finger slot therein, the finger slot dimensioned to allow access to individual dairy cartons positioned near the finger slot but not to allow an individual dairy carton to pass through the finger slot; and a first end wall attached to the floor of the bin having a stop near the floor of the bin and a handle attached to the sidewalls positioned near the top of the bin; and a second end wall.

In another embodiment, the bin holds food containers that do not hold yogurt. That this bin can be used for other dairy products such as butter, sour cream, cream cheese, etc. Many of these products come in tubs that can be stacked and storage of such can be optimized by the utility features claimed in the invention. It is also not limited to dairy products, but also other products that may or may not require refrigeration. Examples of this, include soup, oatmeal and a whole host of products that come in individually sized containers.

What is claimed is:

1. A yogurt bin comprising:
a plurality of individual dairy cartons of yogurt retained within the yogurt bin, each of said plurality of individual dairy cartons having a carton height and a carton diameter;
wherein the plurality of individual dairy cartons are stacked at least two cartons high within the yogurt bin to form a bottom row of dairy cartons and a top row of dairy cartons atop the bottom row of dairy cartons;
a floor;
a top;
a bin height from the floor to the top;
two sidewalls attached to the floor, at least one of the sidewalls having a plurality of finger slots therein,
wherein each of the plurality of finger slots has a depth and a width; and
wherein each of the plurality of finger slots extends down from a top of said sidewall the depth to allow access to the bottom row of dairy cartons;
wherein each of the plurality of finger slots has a width and depth that allows access to said individual dairy cartons of yogurt positioned near the finger slot but does not allow an individual one of the dairy cartons to pass through the finger slot; and
a first end wall attached to the floor of the bin and comprising:
an opening that is large enough for the removal of one of the dairy cartons from the bottom row of dairy cartons;
a stop that extends up from the floor of the bin; and
a handle extending between the sidewalls and positioned proximal the top of the bin with a portion of the handle extending across the first end some depth down from the top of the bin to prevent yogurt bins from the top row from passing through said opening; and
a second end wall.

2. The yogurt bin of claim 1 wherein the second end wall further comprises a second handle.

3. The yogurt bin of claim 1 wherein at least one of the sidewalls has a height dimension equal to more than (n) carton height and less than (n+1) carton height.

4. The yogurt bin of claim 1 wherein the stop of the first end wall is attached to the two sidewalls.

5. The yogurt bin of claim 1,
wherein the plurality of individual dairy cartons of yogurt have a reverse cone shape wall, and
wherein the stop of the first end wall is curved so that surface of the stop acts against the said reverse cone shape wall to keep the plurality of individual dairy cartons of yogurt within the yogurt bin.

6. The yogurt of claim 1 wherein a distance between the two sidewalls is more than a largest carton diameter of the plurality of individual dairy cartons of yogurt.

7. The yogurt bin of claim 1 wherein a distance between the two sidewalls is more than the carton height of one of the plurality of individual dairy carton of yogurt.

8. The yogurt bin of claim 1 wherein a distance between the two sidewalls is more than a largest carton diameter of one of the plurality of individual dairy cartons of yogurt and more than a largest carton height of one of the plurality of individual dairy cartons of yogurt.

9. The yogurt bin of claim 1 that can hold a first type of individual diary carton of yogurt and a second type of individual dairy carton of yogurt, and wherein a distance between the two sidewalls is more than a largest carton diameter of the first type of individual dairy carton of yogurt and more than a carton height of the second type individual dairy carton of yogurt.

10. The yogurt bin of claim 9 that holds the first type of individual diary carton of yogurt in an upright position.

11. The yogurt bin of claim 9 that holds the second type of individual diary carton in a lateral position.

12. The yogurt bin of claim 11 wherein the second type of individual dairy carton of yogurt is a frusto-conical it shape, the yogurt bin allowing the second type of dairy carton of yogurt to roll along the floor of the yogurt bin without log jamming with the sidewalls of the yogurt bin.

13. The yogurt bin of claim 9 that holds the first type of individual diary cartons of yogurt in an upright position and the second type of individual dairy cartons of yogurt in a lateral position, the first type and the second type being held simultaneously.

14. The yogurt bin of claim 1 wherein the plurality of finger slots extend from a position above the floor of the bin to the top of the bin, the position above the floor of the bin being less than the carton height and less than the can diameter.

15. The yogurt bin of claim 1 wherein the floor of the yogurt bin is inclined from a lower portion to a raised portion; wherein the lower portion of the floor is near the first end wall.

16. The yogurt bin of claim 1 further comprising at least one leg near the second end wall that elevates the bin near the second end wall and tilts the floor of the yogurt bin toward the first end wall.

17. The yogurt bin of claim 1 wherein a dimension between the side walls of the yogurt bin is in the range of 3.75 inches to 4.25 inches.

18. The yogurt bin of claim 1 wherein a dimension between the side walls of the yogurt bin is in the range of 3.75 inches to 3.9 inches.

19. The yogurt bin of claim 1, wherein the top is an open top and wherein the bin has an open interior from the floor to the open top.

* * * * *